(12) United States Patent
Hur et al.

(10) Patent No.: US 12,517,319 B2
(45) Date of Patent: Jan. 6, 2026

(54) LENS AND CAMERA MODULE COMPRISING SAME

(71) Applicant: LG ELECTRONICS INC., Seoul (KR)

(72) Inventors: Jihwan Hur, Seoul (KR); Sangcheon Kim, Seoul (KR); Bongho Kim, Seoul (KR); Shinsung Yoo, Seoul (KR); Jinhee Kang, Seoul (KR)

(73) Assignee: LG ELECTRONICS INC., Seoul (KR)

(*) Notice: Subject to any disclaimer, the term of this patent is extended or adjusted under 35 U.S.C. 154(b) by 620 days.

(21) Appl. No.: 17/997,216

(22) PCT Filed: Apr. 29, 2020

(86) PCT No.: PCT/KR2020/005729
§ 371 (c)(1),
(2) Date: Apr. 28, 2023

(87) PCT Pub. No.: WO2021/221212
PCT Pub. Date: Nov. 4, 2021

(65) Prior Publication Data
US 2023/0194823 A1    Jun. 22, 2023

(51) Int. Cl.
*G02B 7/02* (2021.01)
*B29C 45/00* (2006.01)
(Continued)

(52) U.S. Cl.
CPC .......... *G02B 7/021* (2013.01); *B29C 45/0046* (2013.01); *B29D 11/0048* (2013.01); *H04N 23/55* (2023.01); *B29L 2011/0016* (2013.01)

(58) Field of Classification Search
CPC .. G02B 7/021; G02B 2003/0093; G02B 3/00; G02B 7/022; B29C 45/0046;
(Continued)

(56) References Cited

U.S. PATENT DOCUMENTS

| 2010/0073782 A1* | 3/2010 | Kim | G02B 7/02 |
| | | | 359/819 |
| 2013/0194676 A1* | 8/2013 | Sannokyou | G02B 7/025 |
| | | | 359/642 |

FOREIGN PATENT DOCUMENTS

| JP | 2003211500 | 7/2003 |
| JP | 2006272871 | 10/2006 |

(Continued)

OTHER PUBLICATIONS

PCT International Application No. PCT/KR2020/005729, International Search Report dated Jan. 20, 2021, 3 pages.
(Continued)

*Primary Examiner* — James A Dudek
(74) *Attorney, Agent, or Firm* — LEE, HONG, DEGERMAN, KANG & WAIMEY (57) ABSTRACT

The present disclosure relates to a lens and a camera module including the same. The lens according to an embodiment of the present disclosure includes: an optical part forming an optical surface of the lens; a flange part formed around a circumference of the optical part; a first cut portion formed at one side of the flange part; and a second cut portion formed at another side of the flange part, wherein the first cut portion and the second cut portion form an angle, at which the first and second cut portions are perpendicular to each other, with respect to a central axis of the optical part. Accordingly, a lens form error occurring during assembly of the lens may be reduced, and a reduction in resolution of the lens may be prevented.

11 Claims, 9 Drawing Sheets

(51) Int. Cl.
*B29D 11/00* (2006.01)
*H04N 23/55* (2023.01)
*B29L 11/00* (2006.01)

(58) Field of Classification Search
CPC .......... B29D 11/0048; B29D 11/00009; B29D 11/00538; H04N 23/55; B29L 2011/0016
See application file for complete search history.

(56) References Cited

FOREIGN PATENT DOCUMENTS

| | | |
|---|---|---|
| KR | 2019990010090 | 3/1999 |
| KR | 100904996 | 6/2009 |
| KR | 10-1161942 | 7/2012 |
| KR | 101826528 | 2/2018 |
| KR | 10-2019-0070231 | 6/2019 |

OTHER PUBLICATIONS

Korean Intellectual Property Office Application No. 10-2022-7040819, Office Action dated Jan. 10, 2025, 5 pages.

* cited by examiner

LENS AND CAMERA MODULE COMPRISING SAME

CROSS-REFERENCE TO RELATED APPLICATION(S)

This application is the National Stage filing under 35 U.S.C. 371 of International Application No. PCT/KR2020/005729, filed on Apr. 29, 2020, the contents of which is hereby incorporated by reference herein in its entirety.

TECHNICAL FIELD

The following description relates to a lens and a camera module including the same, and more particularly to a lens capable of reducing a lens form error occurring during assembly of the lens, and a camera module including the lens.

BACKGROUND ART

Recently, as camera resolution increases, and a camera module is widely used in a portable terminal such as a mobile terminal, it is becoming important to control a form error of an individual lens assembled to the camera module.

Figure 1:
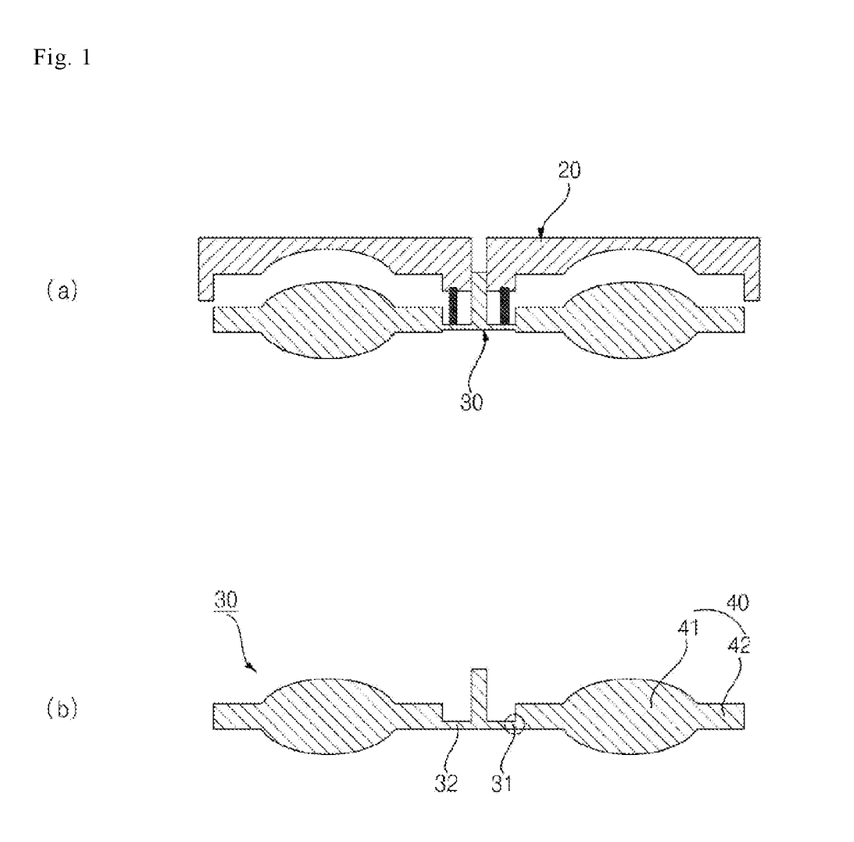
FIG. 1 is a diagram illustrating a lens molded product which is injection molded using a mold.

Referring to FIG. 1, an individual lens 40 is manufactured in such a manner that after a mold 20 having a lens shape is machined, an injection resin or glass is injected into the heated mold 20 to be formed at a high temperature and then ejected from the mold. An error occurs in every stage of lens manufacturing, such that in the process of manufacturing a single-piece lens 40, a lens molding error and a forming error are accumulated in the lens 40. Accordingly, a lens performance indicator is controlled in which a difference between the manufactured lens 40 and a design value is represented as a form error.

Figure 2:
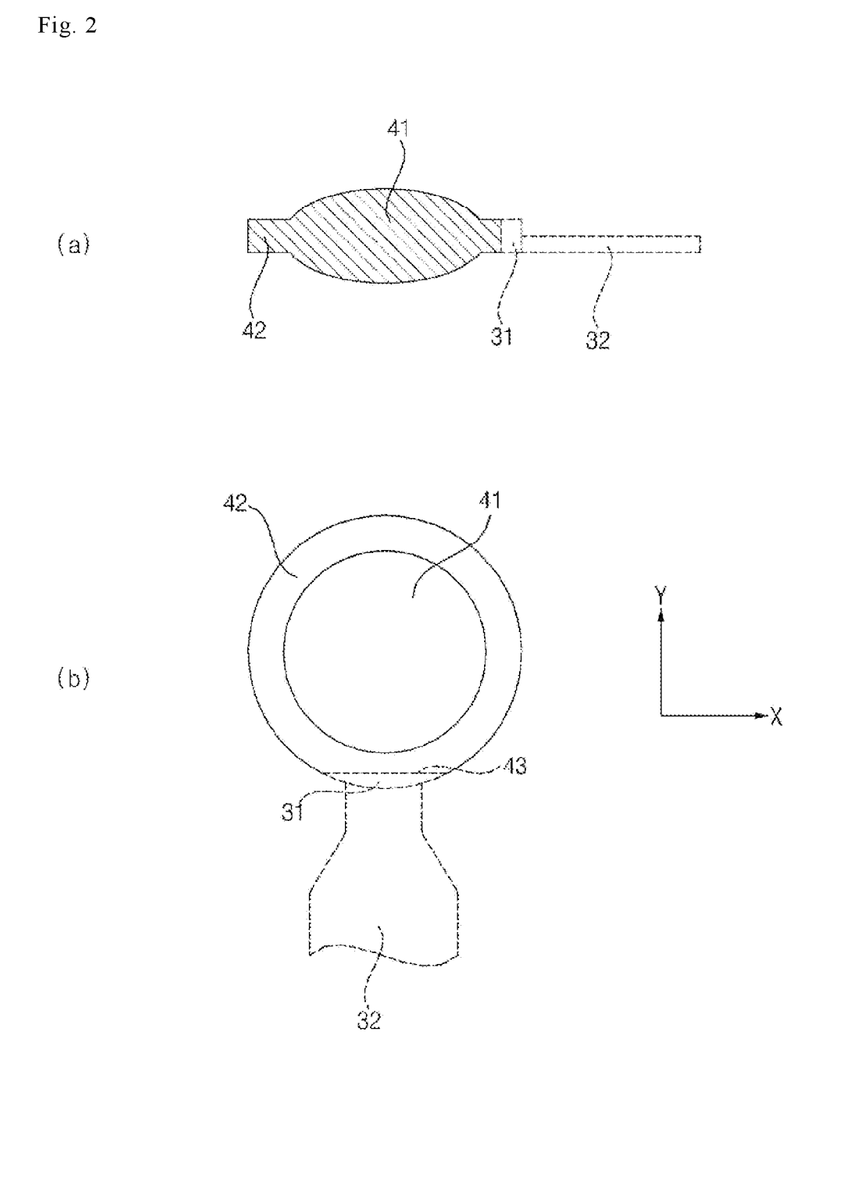
FIG. 2 is a diagram illustrating a shape of an existing lens including a cut portion.

Referring to FIG. 2, after the mold 20 and a molded product 30 are separated, in order to separate a gate 31, which is an injection port of an injection molding material in the mold 20, and a runner 32 from the lens 40, a flange 42 at a periphery of an optical surface 41 of the lens is partially cut to separate the gate 31 from the lens 40. After the gate 31 is separated, the flange 42 is partially cut from the lens 40, such that the lens 40 has an asymmetric structure of a D-cut shape.

In order to achieve desired optical performance, the camera lens is formed with a plurality of individual lenses. The camera lens is manufactured in such a manner that the plurality of individual lenses are fitted into a barrel and are coaxially aligned. Accordingly, even when a lens form error is minimized during manufacture of a single-piece lens, a lens form error occurs during an assembly process by fitting the lens into the barrel. The lens form error during the assembly process may vary depending on a structure and material of the lens and barrel, and a degree of fitting therebetween.

During assembly by fitting the lens 40 into the barrel, force applied by the barrel is distributed at a cut portion 13 (D-cut portion) of the lens 40. Accordingly, a difference in deformation of the assembled lens 40 occurs between a direction horizontal to a cut portion 43 (hereinafter referred to as an X direction) and a direction perpendicular to the cut portion 43 (hereinafter referred to as a Y direction). If the difference in deformation of the lens occurs between the X and Y directions, asymmetry of the lens 40 is intensified, and resolution of the lens 40 is significantly reduced.

Meanwhile, Korean Patent No. 10-0904996 (hereinafter referred to as a related art) relates to a camera module lens, in which the lens includes a first gate cut portion formed at one side of a lens body part, and a second gate cut portion having a different size from the first gate cut portion.

The related art has the purpose and effect of allowing a smooth flow of an injection resin by providing two injection ports during injection molding, and minimizing decenter in the lens by preventing burr from occurring at an air vent side of the lens by using two cut portions which are formed by cutting the respective injection ports.

However, in the related art, as the second gate cut portion is formed at a position opposite the first gate cut portion, a smooth flow of the injection resin may be provided but a difference in force, applied to the lens during fitting assembly, between the X and Y directions increases.

Accordingly, the related art has a problem in that the increased difference in deformation of the lens between the X and Y directions may lead to an increase in form error of the lens.

DISCLOSURE OF INVENTION

Technical Problem

In order to solve the above problems, it is an objective of the present disclosure to provide a lens having a first cut portion and a second cut portion which are perpendicular to each other in a flange part, such that a lens form error occurring during assembly of the lens may be reduced, and a camera module including the lens.

Meanwhile, in order to solve the above problems, it is another objective of the present disclosure to provide a lens having a first cut portion and a plurality of cut portions which are formed at positions symmetrical to each other in a flange part, such that lens aberrations may be reduced, and a reduction in resolution of the lens may be prevented, and a camera module including the lens.

The objectives of the present disclosure are not limited to the aforementioned objectives and other objectives not described herein will be clearly understood by those skilled in the art from the following description.

Technical Solution

In order to achieve the above objectives, a lens according to an embodiment of the present disclosure includes: an optical part forming an optical surface of the lens; a flange part formed around a circumference of the optical part; a first cut portion formed at one side of the flange part; and a second cut portion formed at another side of the flange part, wherein the first cut portion and the second cut portion form an angle, at which the first and second cut portions are perpendicular to each other, with respect to a central axis of the optical part.

Meanwhile, in order to achieve the above objectives, in the lens according to an embodiment of the present disclosure, the first cut portion and the second cut portion may be equal in size and shape.

Meanwhile, in order to achieve the above objectives, in the lens according to an embodiment of the present disclosure, the first cut portion and the second cut portion may have different sizes.

Meanwhile, in order to achieve the above objectives, in the lens according to an embodiment of the present disclosure, both ends of the first cut portion may be spaced apart from both ends of the second cut portion.

Meanwhile, in order to achieve the above objectives, in the lens according to an embodiment of the present disclosure, the first cut portion and the second cut portion may have a shape formed by partially cutting an outer surface of the flange part in a direction perpendicular to a radial direction.

Meanwhile, in order to achieve the above objectives, in the lens according to an embodiment of the present disclosure, the cut shape may be a linear shape.

Meanwhile, in order to achieve the above objectives, in the lens according to an embodiment of the present disclosure, the cut shape may be a curved shape.

Meanwhile, in order to achieve the above objectives, in the lens according to an embodiment of the present disclosure, other portions of the outer surface of the flange part, except for the first cut portion and the second cut portion, may have an arc shape.

Meanwhile, in order to achieve the above objectives, in the lens according to an embodiment of the present disclosure, the first cut portion may be formed by cutting a gate, which is formed on a side where an injection resin is introduced, in the flange part.

Meanwhile, in order to achieve the above objectives, in the lens according to an embodiment of the present disclosure, the second cut portion may be injection molded using a mold.

Meanwhile, in order to achieve the above objectives, a lens according to another embodiment of the present disclosure includes: an optical part forming an optical surface of the lens; a flange part formed around a circumference of the optical part; a first cut portion formed at one side of the flange part; and a plurality of second cut portions formed at another side of the flange part, wherein the first cut portion and the plurality of second cut portions are formed at positions symmetrical to each other with respect to a central axis of the optical part.

Meanwhile, in order to achieve the above objectives, a camera lens module according to an embodiment of the present disclosure includes: at least one lens; and a barrel in which the at least one lens is mounted.

Meanwhile, in order to achieve the above objectives, in the camera lens module according to an embodiment of the present disclosure, other portions of an outer surface of the flange part, except for the first cut portion and the second cut portion, may make contact with an inner surface of the barrel.

Other detailed matters of the exemplary embodiments are included in the detailed description and the drawings.

Advantageous Effects of Invention

The present disclosure has the following effects.

A lens and a camera module including the same according to an embodiment of the present disclosure have an effect in that the lens includes a first cut portion and a second cut portion which are perpendicular to each other in a flange part, such that a lens form error occurring during assembly of the lens may be reduced.

Meanwhile, a lens and a camera module including the same according to an embodiment of the present disclosure have an effect in that the lens includes a first cut portion and a plurality of cut portions which are formed at positions symmetrical to each other in a flange part, such that lens aberrations may be reduced, and a reduction in resolution of the lens may be prevented.

The effects of the present disclosure are not limited to the aforesaid, and other effects not described herein will be clearly understood by those skilled in the art from the following description of the appended claims.

MODE FOR THE INVENTION

Hereinafter, embodiments of the present disclosure will be described in detail with reference to the accompanying drawings.

The same or similar elements are designated by the same reference numerals, and a redundant description thereof will be omitted. The terms "module" and "unit" for elements used in the following description are given simply in view of the ease of the description, and do not have a distinguishing meaning or role. Therefore, the "module" and the "unit" may be used interchangeably.

In addition, it will be noted that a detailed description of known arts will be omitted if it is determined that the detailed description of the known arts can obscure the embodiments of the present disclosure. Further, the accompanying drawings are used to help easily understand various technical features and it should be understood that the embodiments presented herein are not limited by the accompanying drawings, and the present disclosure should be construed to extend to any alterations, equivalents and substitutes in addition to those which are particularly set out in the accompanying drawings.

It will be understood that, although the terms first, second, etc., may be used herein to describe various elements, these elements should not be limited by these terms. These terms are only used to distinguish one element from another.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

As used herein, the singular forms are intended to include the plural forms as well, unless the context clearly indicates otherwise.

It should be understood that the terms 'include", "have", etc. when used in this specification, specify the presence of stated features, integers, steps, operations, elements, components, or combinations of them but do not preclude the presence or addition of one or more other features, integers, steps, operations, elements, components, or combinations thereof.

Figure 3:
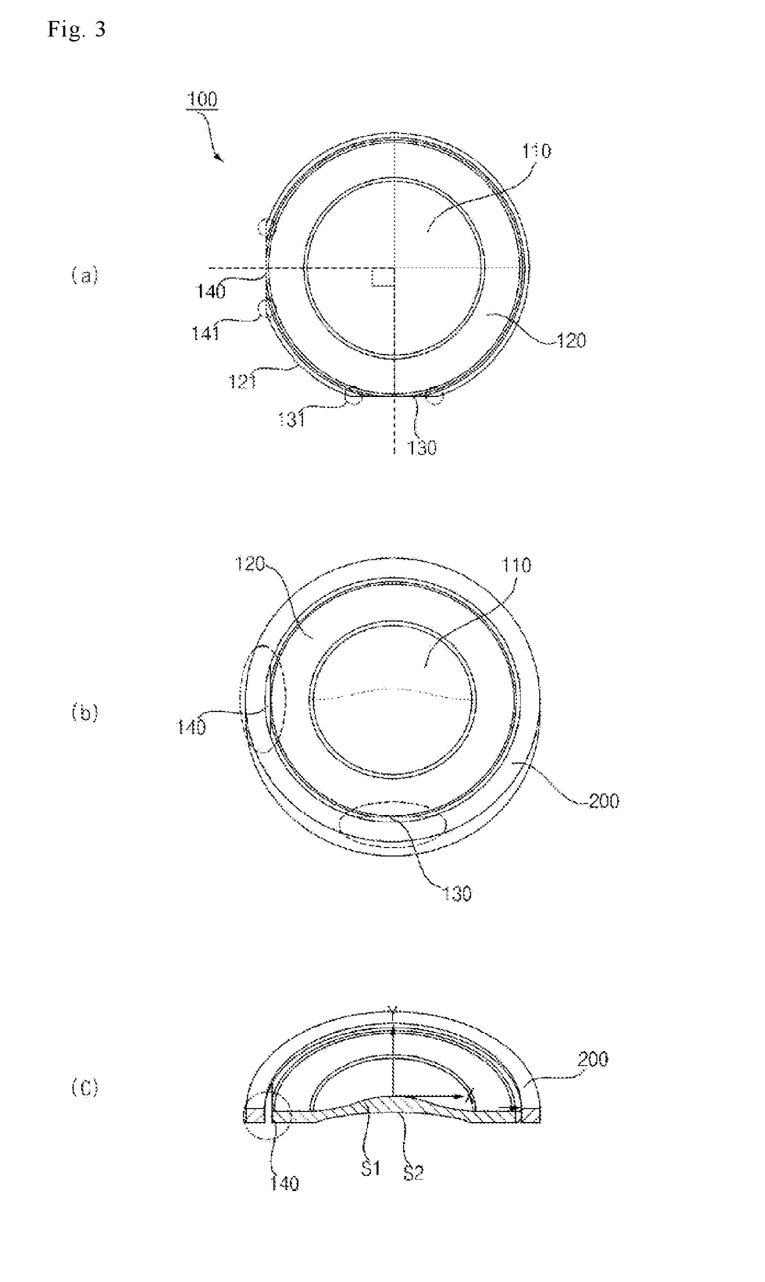
FIG. 3 is a diagram illustrating a lens according to an embodiment of the present disclosure, and a shape of the lens assembled in a barrel.

FIG. 3 is a diagram illustrating a lens 100 according to an embodiment of the present disclosure, and a shape of the lens 100 assembled in a barrel 200.

Referring to the drawing, the lens 100 according to an embodiment of the present disclosure may include an optical part 110, a flange part 120, a first cut portion 130, and a second cut portion 140.

The optical part 110 may form an optical surface of the lens 100. The optical part 110 is a portion where light is transmitted and refracts light reflected from a subject.

The optical surface may include a first optical surface S1, disposed at one side of the lens 100, and a second optical surface S2 disposed at another side thereof. In the following description, all graphs show results obtained based on the first optical surface 51.

A shape of the lens is determined by a convex, concave, spherical, or aspherical shape of the optical part 110. Depending on the shape of the optical part 110, the lens 100 may have a shape of a concave lens, a convex lens, meniscus lens, a spherical lens, or an aspherical lens.

The flange part 120 may be formed in a circular shape around a circumference of the optical part 110 and may be integrally formed with the optical part 110.

The lens 100 including the optical part 110 and the flange part 120 may be made of a plastic material or a glass material.

The first cut portion 130 is formed at one side of the flange part 120. When the lens 100 is injection molded using a mold, a gate is formed at a position corresponding to a passage through which an injection resin is introduced. The first cut portion 130 is formed to remove the gate. The first cut portion 130 may be formed by cutting one side of the flange part 120 in the lens 100 formed by injection molding.

The second cut portion 140 is formed at another side of the flange part 120. The second cut portion 140 and the first cut portion 130 may form an angle (90°), at which the cut portions are perpendicular to each other, with respect to a central axis of the lens.

The second cut portion 140 may be injection molded using a mold (not shown). Accordingly, in order to form the second cut portion 140, a core of the mold is shaped so that the second cut portion 140 may be formed at one side of flange part 120 of the lens 100.

When the second cut portion 140 and the first cut portion 130 are disposed to form an angle of 90°, the mold may be formed so that the shape of the core, shaped for forming the second cut portion, and the injection port of the injection resin may form an angle of 90°.

Specifically, the mold may include an upper mold having an upper core and a lower mold having a lower core. The lower mold may have an injection port through which the injection resin is introduced, and a space for forming a molded product, the space surrounding the injection port and formed at an upper portion of the lower mold. The upper mold may be coupled to the upper portion of the lower mold to form a molded product. The upper core and the lower core may have a circular shape with a linear portion, having the same shape as the second cut portion, being formed at a portion of the circular shape, so that a shape of the second cut portion may be formed in the lens. The upper mold or the lower mold may have a fixed shape or a movable shape.

Meanwhile, the lens 100 according to an embodiment of the present disclosure may be manufactured by a press forming method in addition to the injection molding method. In this case, the lens 100 may be manufactured by putting an optical material in a mold and pressing the material.

Meanwhile, the first cut portion 130 and the second cut portion 140 may be formed by partially cutting the outer surface of the flange part 120 in a direction perpendicular to a radial direction. In order to remove the gate, the first cut portion 130 may be formed by cutting a portion of a side surface of the flange part 120 in the direction perpendicular to the radial direction.

A cut surface or cut shape of the first cut portion 130 may have a linear or straight shape, or a convex or concave curved shape. The second cut portion 140 may have the same shape as the first cut portion 130.

Other portions of the outer surface of the flange part 120, except for the first cut portion 130 and the second cut portion 140, may have an arc shape which is defined as an arc portion 121 in the present disclosure. When the lens 100 is inserted and mounted in the barrel 200, the arc portion 121 makes contact with an inner surface of the barrel 200. In this manner, the lens 100 may be secured in the barrel 200.

Meanwhile, if the first cut portion 130 and the second cut portion 140 increase in size, the cut surfaces of the first cut portion 130 and the second cut portion 140 may be partially formed in the optical part 110, in which case performance of the optical part 110 may be degraded. Accordingly, the cut surfaces of the first cut portion 130 and the second cut portion 140 may be formed only inside the flange part 120.

Meanwhile, both ends 131 of the first cut portion 130 and both ends 141 of the second cut portion 140 may be spaced apart from each other. When the first cut portion 130 or the second cut portion 140 increases in size, one end of the first cut portion 130 may meet one end of the second cut portion 140.

Accordingly, a portion at which the one end of the first cut portion 130 and the one end of the second cut portion 140 meet each other in the flange part 120 may not make contact with the inner surface of the barrel 200. In this case, the lens 100 may not be secured in the barrel 200. Accordingly, both ends 131 of the first cut portion 130 and both ends 141 of the second cut portion 140 may be spaced apart from each other, so that the arc portion 121 may be formed between the first cut portion 130 and the second cut portion 140.

Figure 4:
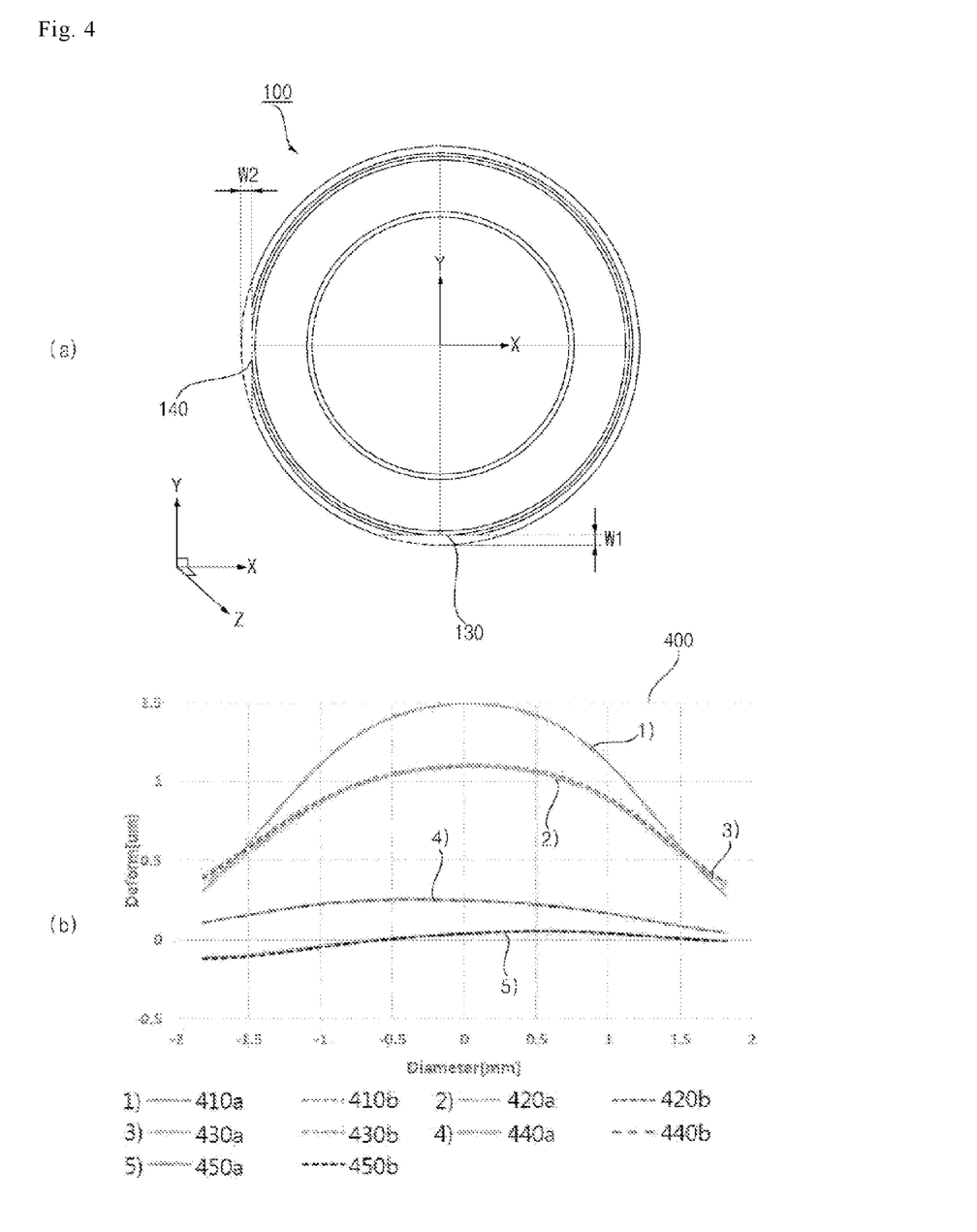
FIG. 4 is a diagram referred to in the description of lens deformation according to a change in width of a second cut portion in the lens of FIG. 3.

FIG. 4 is a diagram referred to in the description of lens deformation according to a change in width of the second cut portion 140 in the lens 100 of FIG. 3.

The first cut portion 130 and the second cut portion 140 in the lens 100 may be equal in size. If the first cut portion 130 and the second cut portion 140 are equal in size and shape, the same force may be applied by the barrel 200 to the lens 100 in the X-axis direction and the Y-axis direction. Accordingly, asymmetric deformation of the lens 100 may be minimized.

Meanwhile, the first cut portion 130 and the second cut portion 140 may have different sizes. If the first cut portion 130 and the second cut portion 140 have different sizes, different forces may be applied by the barrel 200 to the lens 100 in the X-axis direction and the Y-axis direction. In this case, by changing the size of the second cut portion 140, each of a maximum deformation value and an asymmetric deformation value may be adjusted to a target value.

Referring to the drawing, the deformation of the lens 100 is measured by fixing a width W1 of the first cut portion 130 and by changing a width W2 of the second cut portion 140, and the measurement results are shown in a graph 400. In the graph 400, "1)" indicates the case where W2 is equal to W1, "2)" and "3)" indicate the case where W2 is greater than W1 by 0.05 mm and 0.1 mm, respectively, and "4)" and "4)" indicate the case where W2 is smaller than W1 by 0.05 mm and 0.1 mm, respectively.

A horizontal axis of the graph 400 represents a distance from the center of the lens 100 in a direction parallel to a surface of the first cut portion 130 (X direction), and a vertical axis thereof represents a distance from the center of the lens 100 in a direction perpendicular to an optical surface (Z direction).

Referring to the graph 400, if the width W1 of the first cut portion 130 and the width W2 of the second cut portion 140 are equal to each other (see "1)"), the largest maximum deformation occurs at a point (center of the lens) at which coordinates on the horizontal axis are zero, and if the width W2 of the second cut portion 140 is smaller than the width W1 of the first cut portion 130 (see "4)" and "5)"), the smallest maximum deformation occurs.

Meanwhile, if W1 and W2 are equal to each other, lens deformation 410a in the X-axis direction and lens deformation 410b in the Y-axis direction are symmetrical with respect to the center of the lens. Further, as a graph of the lens deformation 410a in the X-axis direction coincides with a graph of the lens deformation 410b in the Y-axis direction, it can be confirmed that the lens deformation 410a in the X-axis direction is almost equal to the lens deformation 410b in the Y-axis direction.

If W2 is greater than W1, lens deformations 420a and 430a in the X-axis direction and lens deformations 420b and 430b in the Y-axis direction are almost symmetrical with respect to the center of the lens. However, it can be confirmed that the lens deformations 420a and 430a in the X-axis direction and the lens deformations 420b and 430b in the Y-axis direction are different from each other.

If W2 is smaller than W1, lens deformations 440a and 450a in the X-axis direction and lens deformations 440b and 450b in the Y-axis direction are severely asymmetrical.

Accordingly, if W2 and W1 are equal to each other, asymmetric deformation of the lens 100 may be minimized, and if W2 is smaller than W1, maximum deformation of the lens 100 may be minimized.

Optical performance of the lens 100 may be greatly affected by the asymmetric deformation of the lens. Accordingly, the first cut portion 130 and the second cut portion 140 may be designed to have the same size. However, the first cut portion 130 and the second cut portion 140 may have different sizes.

Figure 5:
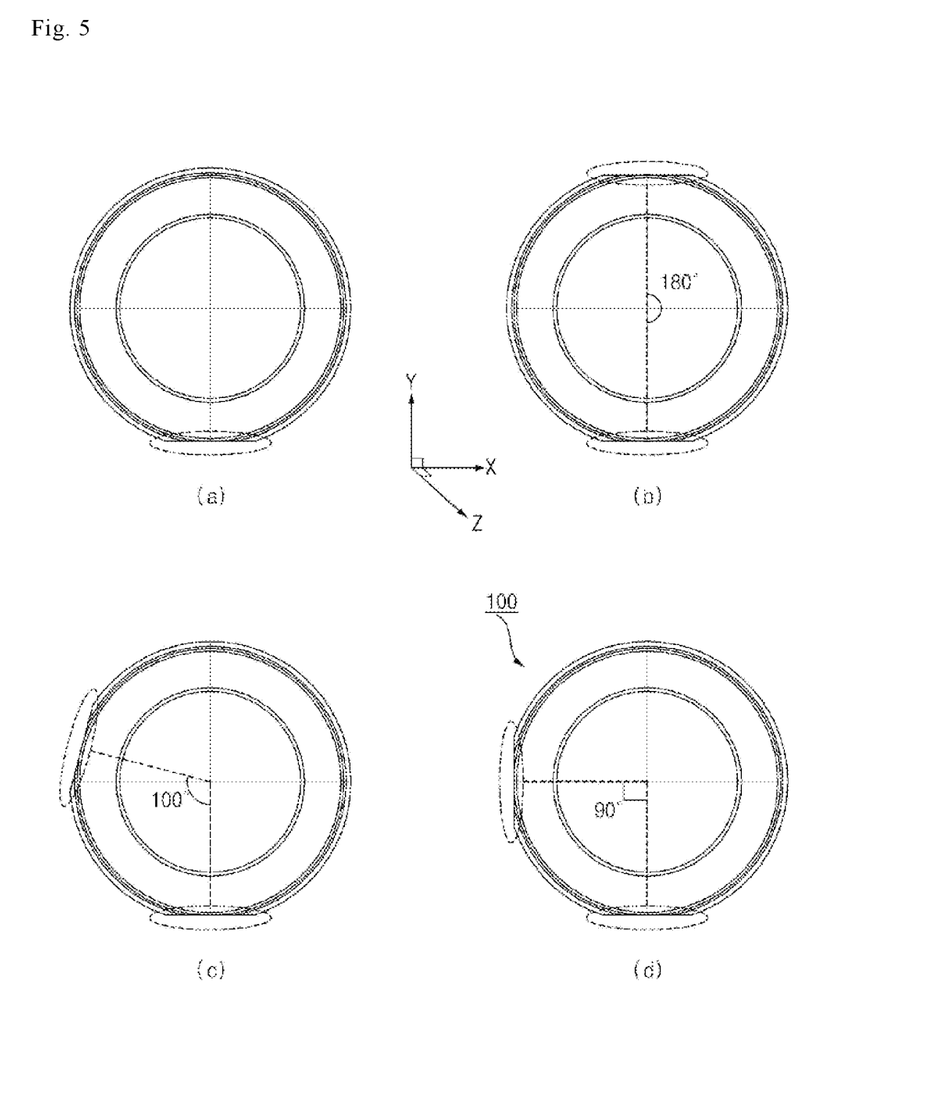
FIG. 5 is a diagram illustrating various examples of the lens of FIG. 3 according to a position of the second cut portion.
Figure 6:
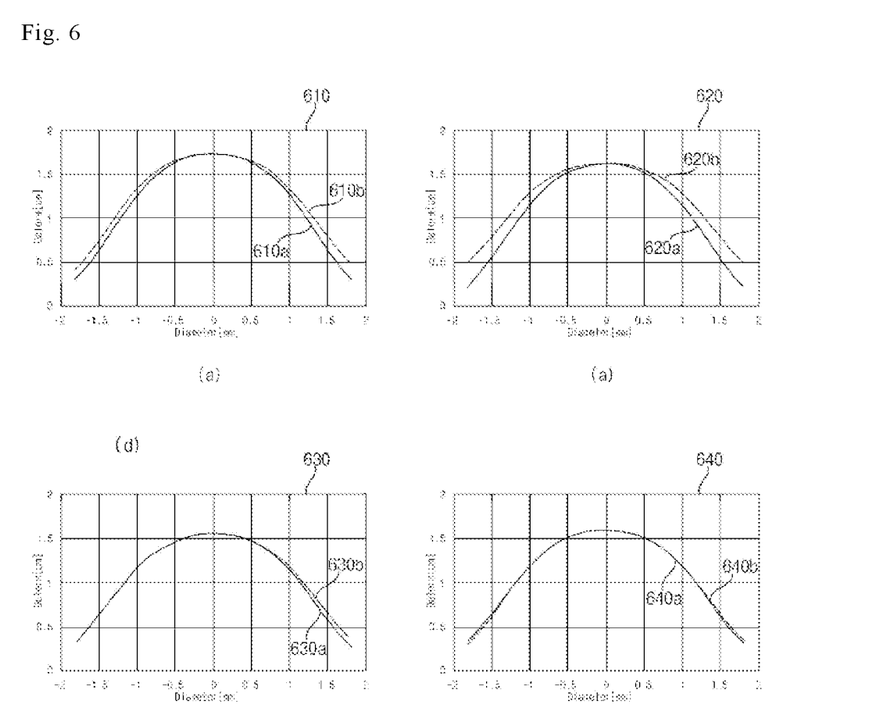
FIG. 6 is a diagram illustrating a graph showing lens deformation occurring in each lens of FIG. 5.

FIG. 5 is a diagram illustrating various examples of the lens 100 of FIG. 3 according to a position of the second cut portion 140, and FIG. 6 is a diagram illustrating a graph showing lens deformation occurring in each lens of FIG. 5.

Referring to FIG. 5, in the lens 100 according to an embodiment of the present disclosure, the second cut portion 140 and the first cut portion 130 may form an angle, at which the cut portions may be perpendicular to each other, with respect to the central axis of the lens ((d) of FIG. 5).

Meanwhile, the second cut portion 140 and the first cut portion 130 may be disposed at symmetrically opposite positions of the flange part 120 ((b) of FIG. 5) or may be disposed to form an acute angle or an obtuse angle ((c) of FIG. 5). In (a) of FIG. 5, an existing lens structure including only the first cut portion is illustrated.

Referring to (a) of FIG. 6, the existing lens having only the first cut portion formed therein has a maximum deformation of about 1.7 um at the center of the lens. In addition, compared to a lens deformation 610a in the X direction, a deviation of a lens deformation 610b in the Y direction becomes smaller from the center toward the periphery of the lens. Accordingly, it can be confirmed that asymmetric deformation of the lens occurs in the X and Y directions.

Referring to (b) of FIG. 6, a lens, having the first cut portion and the second cut portion that are disposed opposite each other and form an angle of 180 degrees, has a maximum deformation of about 1.65 um at the center of the lens. The maximum deformation is reduced compared to the existing lens. However, a difference between a lens deformation 620a in the X direction and a lens deformation 620b in the Y direction significantly increases from the center toward the periphery of the lens. Accordingly, it can be confirmed that asymmetric deformation of the lens becomes larger compared to the existing lens.

Referring to (c) of FIG. 6, a lens, having the first cut portion and the second cut portion that form an angle of 100 degrees, has a maximum deformation of about 1.6 um at the center of the lens, and a difference between a lens deformation 630a in the X direction and a lens deformation 630b in the Y direction occurs only in one region.

Referring to (d) of FIG. 6, a lens, having the first cut portion and the second cut portion that form an angle of 90 degrees, has a maximum deformation of about 1.65 um at the center of the lens, and a lens deformation 640a in the X direction is equal to a lens deformation 640b in the Y direction with no difference therebetween.

Accordingly, if one second cut portion 140 is formed in the lens, the maximum deformation of the lens is reduced compared to the lens having only the first cut portion formed therein.

In addition, a degree of asymmetric deformation varies depending on the angle formed between the second cut portion 140 and the first cut portion 130, and it can be confirmed that in a lens having the first cut portion and the second portion that form an angle of 90 degrees, asymmetric deformation of the lens is minimized.

Figure 7:
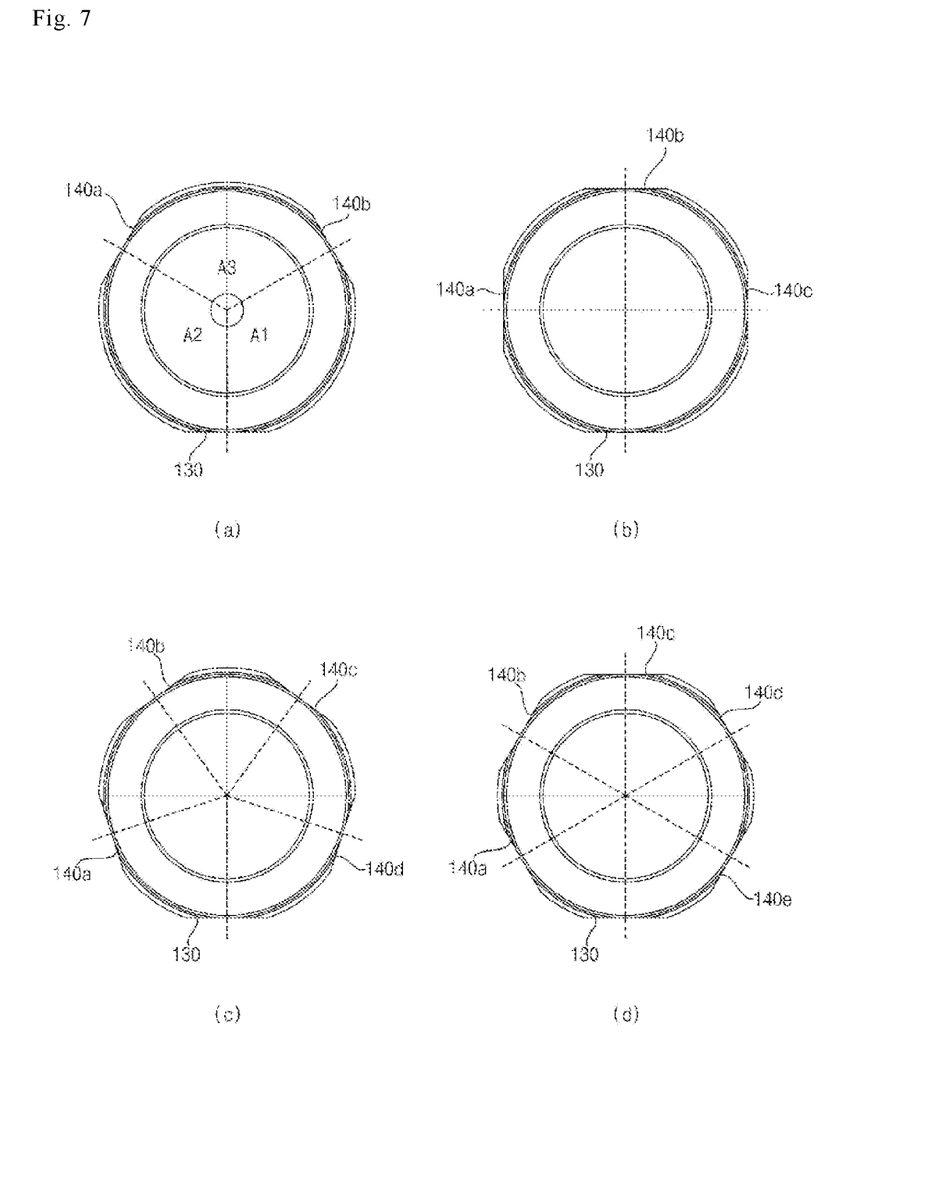
FIG. 7 is a diagram illustrating a lens according to another embodiment of the present disclosure.

FIG. 7 is a diagram illustrating a lens 100 according to another embodiment of the present disclosure.

Referring to the drawing, the lens 100 according to another embodiment of the present disclosure may include the optical part 110, the flange part 120, the first cut portion 130, and a plurality of second cut portions 140.

The flange part 120 may be formed in a circular shape around a circumference of the optical part 110 and may be integrally formed with the optical part 110.

The first cut portion 130 may be formed at one side of the flange part 120. The first cut portion 130 may be formed by cutting one side of the flange part 120 in the lens 100 formed by injection molding.

The second cut portion 140 may be formed at another side of the flange part 120. At least two or more second cut portions 140 may be formed. The plurality of second cut portions 140 may be disposed opposite the first cut portion 130 with respect to the central axis of the lens 100. In this case, the first cut portion 130 and the respective second cut portions 140 may be formed in an equiangular symmetric spiral shape, so that all angles formed between adjacent cut portions among the first cut portion 130 and the respective second cut portions 140 may be equal to each other.

For example, if there are two second cut portions 140 (see (a) of FIG. 7), a total of three cut portions are formed in the flange part 120, and angles A1, A2, and A3 formed between the first cut portion 130 and the respective second cut portions 140a and 140b may be an equal angle of 120 degrees.

If there are three second cut portions 140 (see (b) of FIG. 7), all angles formed between the first cut portion 130 and the respective second cut portions 140*a*, 140*b*, and 140*c* may be an equal angle of 90 degrees. If there are four or five second cut portions 140 (see (c) or (d) of FIG. 7), the respective cut portions may be formed in the flange part 120 in an equiangular symmetric spiral shape and may have an angle of 72 or 60 degrees.

By forming the first cut portion 130 and the plurality of second cut portions 140, which are formed at equal intervals in the outer surface of the flange part 120, force applied by the barrel 200 may be distributed evenly, and asymmetric deformation of the lens 100 which occurs during assembly of the lens 100 may be minimized.

Meanwhile, the number of second cut portions 140 formed in the flange part 120 is not limited thereto and may be determined depending on a diameter of the flange part 120 and the size and shape of the second cut portions 140.

The plurality of second cut portions 140 may be injection molded using a mold. Accordingly, in order to form the plurality of second cut portions 140, a core of the mold is shaped so that the plurality of second cut portions 140 may be formed at one side of the flange part 120 of the lens 100.

For example, in a mold for molding the lens 100 having two second cut portions 140 formed therein, the shapes of the core, shaped for forming the second cut portions, and the injection port of the injection resin may form an angle of 120 degrees.

Meanwhile, the lens 100 according to another embodiment of the present disclosure may be manufactured by a press forming method in addition to the injection molding method. In this case, the lens 100 may be manufactured by putting an optical material in a mold and pressing the material.

Meanwhile, the first cut portion 130 and the plurality of second cut portions 140 may be formed by partially cutting the outer surface of the flange part 120 in a direction perpendicular to the radial direction. The plurality of second cut portions 140 may have the same shape as the first cut portion 130.

Other portions of the outer surface of the flange part 120, except for the first cut portion 130 and the second cut portions 140 formed therein, may have an arc shape. Meanwhile, both ends 131 of the first cut portion 130 may be spaced apart from both ends 141 of the second cut portions 140.

Both ends 131 of the first cut portion 130 and both ends 141 of the second cut portions 140 may be spaced apart from each other so that the arc portion 121 may be formed between the first cut portion 130 and the plurality of second cut portions 140.

Figure 8:
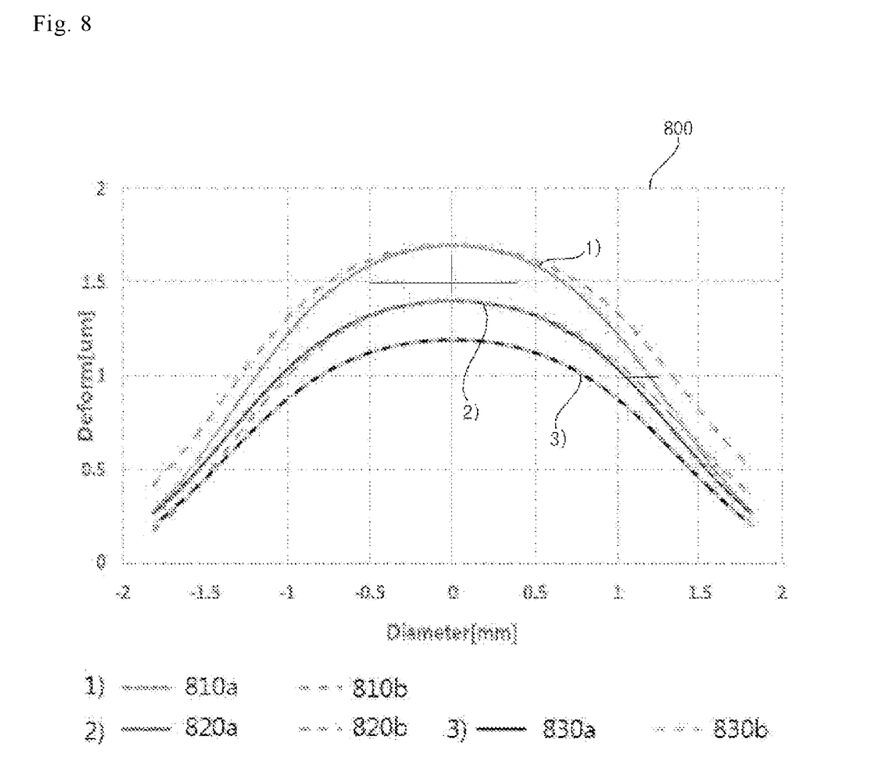
FIG. 8 is a diagram illustrating a graph showing lens deformation occurring in each lens of FIG. 7.

FIG. 8 is a diagram illustrating a graph showing lens deformation occurring in each lens of FIG. 7.

In the drawing, "1)" shows a result of lens deformation of the existing lens having only the first portion 130 formed therein, "2)" shows a result of lens deformation in an example of a lens ((a) of FIG. 7) having two second cut portions 140 formed therein, and "3)" shows a result of lens deformation in an example of a lens ((b) of FIG. 7) having three second cut portions 140 formed therein.

Referring to the drawing, the existing lens having only the first cut portion 130 has a maximum deformation of about 1.7 um at the center of the lens. In addition, compared to a lens deformation 810*a* in the X direction, a deviation of a lens deformation 810*b* in the Y direction becomes smaller from the center toward the periphery of the lens. Accordingly, it can be confirmed that asymmetric deformation of the lens occurs in the X and Y directions.

Meanwhile, a lens having two second cut portions 140 disposed symmetrical to each other has a maximum deformation of about 1.4 um at the center of the lens. In addition, a difference between a lens deformation 820*a* in the X direction and a lens deformation 820*b* in the Y direction increases from the center toward the periphery of the lens.

Meanwhile, a lens having three second cut portions 140 disposed symmetrical to each other has a maximum deformation of about 1.2 um at the center of the lens. In addition, a lens deformation 830*a* in the X direction is equal to a lens deformation 830*b* in the Y direction with no difference therebetween.

It can be confirmed that in comparison with the existing lens, as the number of second cut portions 140 increases which are disposed symmetrical to each other in the flange part 120, the maximum deformation of the lens decreases. Further, as the number of the second cut portions 140 increases which are disposed symmetrical to each other, asymmetric deformation of the lens may also decrease.

Figure 9:
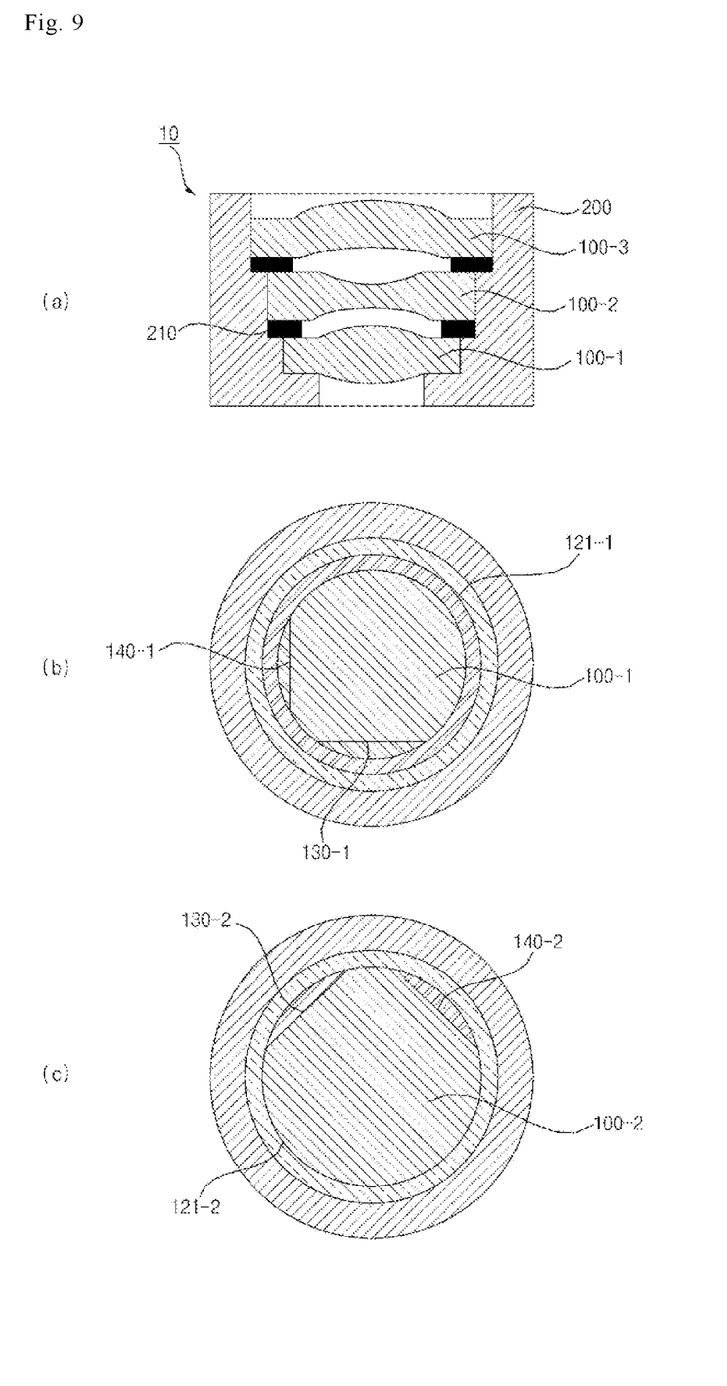
FIG. 9 is a diagram illustrating a coupling structure between a barrel and a lens in a camera module including a lens according to an embodiment of the present disclosure.

FIG. 9 is a diagram illustrating a coupling structure between the barrel 200 and the lens 100 in a camera module 10 including the lens 100 according to an embodiment of the present disclosure. In FIG. 9, (a) is a view, as seen from one side, of the barrel 200 to which the lens 100 is coupled, and (b) and c) are views of the barrel 200 to which the lens 100 is coupled, as seen from above the barrel 200.

The camera module 10 according to an embodiment of the present disclosure may be a camera module mounted in a portable electronic device, such as a mobile terminal, a smartphone, a tablet PC, and the like.

The camera module 10 may include at least one lens 100 and a barrel 200 in which the lens 100 is press-fit and mounted therein. In this embodiment, it is illustrated that the camera module 10 includes three lenses 100-1, 100-2, and 100-3, but the number of lenses 100 included therein may vary depending on the design of the camera module 10.

The respective lenses 100-1, 100-2, and 100-3 have optical characteristics, such as the same refractive index or different refractive indices. The respective lenses 100-1, 100-2, and 100-3 may be press-fit into the barrel 200 along an optical axis. In this embodiment, the optical axis of the lens 100 may be parallel to a thickness direction of an electronic device.

Meanwhile, the optical axis of the lens 100 may be perpendicular to the thickness direction of the electronic device. Generally, light reflected from a subject is incident in the thickness direction of the electronic device, such that in order to change a direction of light, a reflection member, such as a mirror, prism, etc., which is capable of changing a light traveling direction by refraction or reflection at 90 degrees, may be provided at a front side of the camera module 10.

The barrel 200 may have a hollow cylindrical shape, so that at least one of the lenses 100-1, 100-2, and 100-3 may be received therein. Meanwhile, the barrel 200 may have an inner circumferential surface formed in the barrel 200 and having a diameter equal to smaller than a diameter of each lens, so that lenses having different diameters may be received therein.

The respective lenses 100-1, 100-2, and 100-3 may be fitted into the barrel 200 sequentially from the lens 100-1 disposed at the foremost of the barrel 200 to the lens 100-3 disposed at the rearmost thereof.

A spacer 210 for maintaining a distance between the lenses may be inserted between the respective lenses 100-1, 100-2, and 100-3. A distance between the lenses may be set by adjusting a thickness of the spacer 210.

Referring to the drawing, portions 121-1 and 121-2 of the respective lenses 100-1, 100-2, and 100-3, except for first cut portions 130-1 and 130-2 and second cut portions 140-1 and 140-2 which are formed in the outer surface of the flange part 120, may be formed to make contact with the inner surface of the barrel 200.

To this end, the respective lenses 100-1, 100-2, and 100-3 may have diameters equal to or greater than a diameter of the inside of the barrel 200.

Accordingly, the respective lenses may be fixed in the barrel so as not to be moved therein, and the lenses may be arranged along the optical axis, and a form error of the respective lenses may be minimized.

Meanwhile, the respective lenses 100-1, 100-2, and 100-3 may be mounted in the barrel 200, with the first cut portions 130-1, 130-2, and 130-3 being formed in different directions.

When all the lenses are assembled, the barrel 200 may receive force from the respective lenses 100-1, 100-2, and 100-3 which are fitted therein. Accordingly, the lens 100 is mounted with the respective first cut portions 130-1, 130-2, and 130-3 being formed in different directions, such that the force applied to the barrel 200 may be distributed in different directions. Accordingly, the form error of the respective lenses in the barrel 200 may be minimized.

As for the lens 100 and the camera module 10 including the same according to the present disclosure, the configurations and methods of the embodiments of the present disclosure described above are not limited in its application, but the entirety or a portion of the embodiments may be selectively combined to be configured into various modifications.

While the present disclosure has been particularly shown and described with reference to preferred embodiments thereof, it will be understood by those skilled in the art that the present disclosure is not limited to those exemplary embodiments and various changes in form and details may be made therein without departing from the scope and spirit of the invention as defined by the appended claims and should not be individually understood from the technical spirit or prospect of the present disclosure.

What is claimed is:

1. A camera module lens comprising:
a plurality of lenses; and
a barrel,
wherein each of the plurality of lenses comprises:
an optical part forming an optical surface of a respective lens among the plurality of lenses;
a flange part formed around a circumference of the optical part;
a first cut portion formed at one side of the flange part; and
a second cut portion formed at another side of the flange part,
wherein the first cut portion and the second cut portion form an angle with respect to a central axis of the optical part, and
the plurality of lens are mounted in the barrel such that the first cut portion corresponding to each of the plurality of lenses are oriented in different directions.

2. The camera module of claim 1, wherein the first cut portion and the second cut portion are equal in size and shape.

3. The camera module of claim 1, wherein the first cut portion and the second cut portion have different sizes.

4. The camera module of claim 1, wherein both ends of the first cut portion are spaced apart from both ends of the second cut portion.

5. The camera module of claim 1, wherein the first cut portion and the second cut portion have a shape formed by partially cutting an outer surface of the flange part in a direction perpendicular to a radial direction.

6. The camera module of claim 5, wherein the shape is a linear shape.

7. The camera module of claim 5, wherein the shape is a curved shape.

8. The camera module of claim 1, wherein other portions of an outer surface of the flange part, except for the first cut portion and the second cut portion, have an arc shape.

9. The camera module of claim 1, wherein the first cut portion is formed by cutting a gate, which is formed on a side where an injection resin is introduced, in the flange part.

10. The camera module of claim 1, wherein the second cut portion is injection molded using a mold.

11. The camera module of claim 1, wherein the first cut portion and the second cut portion form the angle, at which the first and second cut portions are perpendicular to each other, with respect to the central axis of the optical part.

* * * * *